Patented Feb. 9, 1937

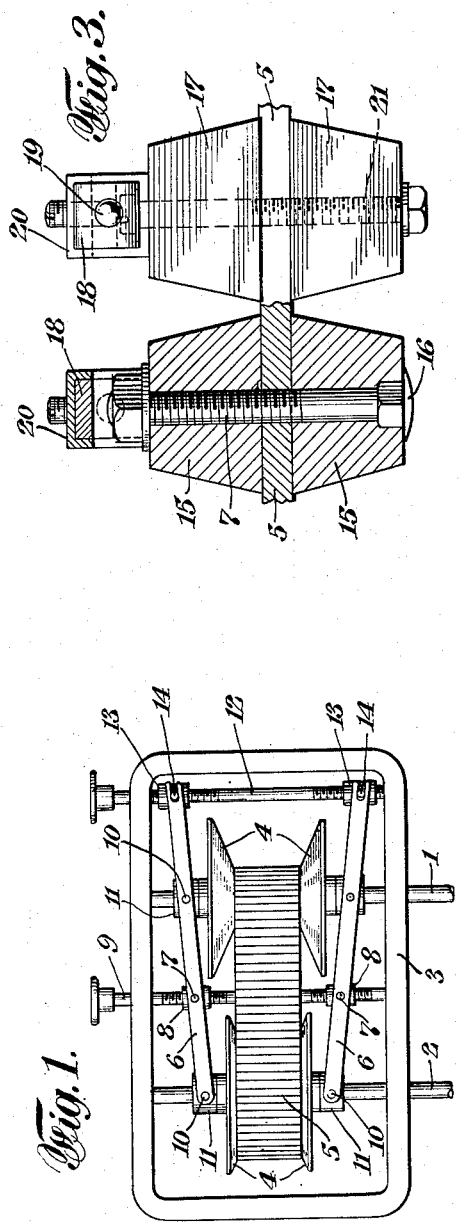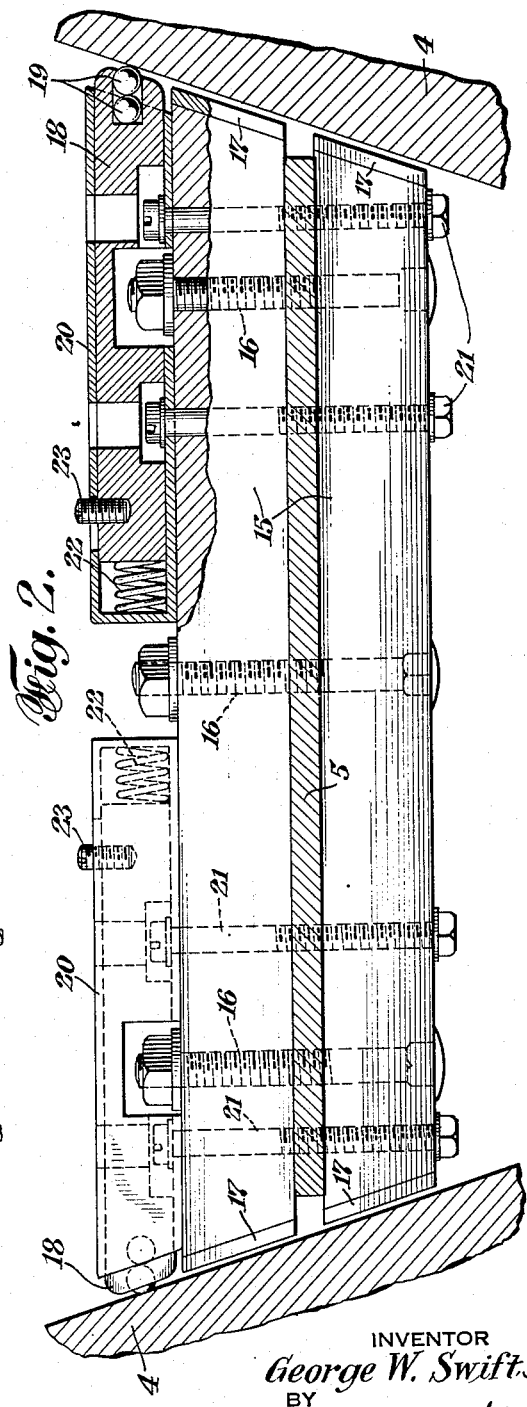

2,070,382

UNITED STATES PATENT OFFICE 2,070,382

VARIABLE SPEED TRANSMISSION

George W. Swift, Jr., Bordentown, N. J., assignor to George W. Swift, Jr., Inc., Bordentown, N. J., a corporation of New Jersey Application March 7, 1936, Serial No. 67,598

6 Claims. (Cl. 74—230.17)

The invention relates to variable speed transmissions of the adjustable cone type—i. e. having sets of opposed cones which are adjustable toward and from each other and having a belt working between the opposed cones, together with mechanisms for adjusting the spacings of the cones to enable power to be transmitted at different ratios. Variable speed mechanisms of the above character are well known, and it is exceedingly difficult if not impossible to adjust them while at rest, on account of binding between the engaging surfaces of the belt and the pair of opposed cones which are to be moved toward each other during the adjustment. The present invention aims to provide a variable speed transmission wherein any such binding action between the belt and the cones during adjustment, will be substantially avoided. Another object of the invention is to enable speed ratio adjustments of a variable speed transmission of the above character, to be made readily and quickly while the transmission is not running. Further objects and advantages of the invention will be in part obvious and in part specifically referred to in the description hereinafter contained which, taken in conjunction with the accompanying drawing, discloses a preferred embodiment of the invention. Such embodiment, however, is to be regarded as merely illustrative of its principles. In the drawing—

Fig. 1 is a plan view of a variable speed transmission of well known type, in connection with which the present invention may be employed.

Fig. 2 is an enlarged cross sectional view of a belt operating between a pair of cones, and constructed to operate in accordance with the present invention.

Fig. 3 is a side view of a portion of the belt shown in Fig. 2 and partly in section.

The invention is disclosed as applied to a variable speed transmission of well known construction, and having its main operating parts shown in simple form, in Fig. 1. This figure illustrates parallel driving and driven shafts 1 and 2 which are mounted in a suitable housing 3, and each shaft slidably supports a pair of cones or cone-faced disks 4 between which runs a belt 5. The disks 4 rotate with their respective shafts and may be adjusted toward and from each other by levers 6, pivoted at 7, to threaded collars 8 on a belt tightening screw 9. These levers 6 are also pivoted at 10 to collars 11 loose on the shafts 1 and 2, and connected for axial (but not rotative) movement with cones 4. The levers 6 are operated simultaneously by a screw 12 having threaded collars 13, carrying pins 14 engaging in the forked ends of levers 6.

The screw 12 and associated parts accordingly constitute a mechanism whereby the two pairs of cones 4 may be oppositely adjusted to vary the speed ratio between the driving and driven shafts,—i. e. one set of cones will be adjusted toward each other and the other set from each other, to increase or decrease the radius of action of belt 5 in respect to the driving and driven shafts.

The screw 9 constitutes a mechanism whereby the tightness of the belt 5 may be adjusted; when this screw is operated to move the threaded collars 8 toward each other, both sets of cones are adjusted toward each other to tighten the belt, and conversely adjustment in the opposite direction loosens the belt.

In a variable speed transmission of the construction above described, the flexible belt 5 carries a series of inner and outer cross pieces 15 held in place by bolts 16 and provided with frictional cone-engaging surfaces 17 which are usually made of leather. In the normal operation of the apparatus the screw 9 in the past has merely been adjusted from time to time to keep the friction-surfaces 17 tightly in engagement with cones 4. It has been the general practice to adjust the speed ratio of the transmission only while the mechanism is running, since otherwise the friction surfaces 17 tend to bind tightly against the pair of cones 4 which are being adjusted toward each other to increase the radius of action of belt 5, and this binding action takes place even though the screw 9 be then adjusted to relieve the tension in the belt. In certain applications of these variable speed transmissions of the opposed cone type, it accordingly has been necessary to start up the machine especially in order to adjust the speed ratio, under circumstances where it would have been more convenient, if feasible, to adjust the speed ratio while the machinery was shut down.

I have found that the operation of adjusting the variable speed transmission to different speed ratios may be much facilitated, and where desirable made possible to be carried on while the machinery is shut down, by providing anti-friction members to act between the belt and the cones, which are normally inactive in the sense that they do not interfere with the normal driving engagement of the parts, but which may operate when the tension on the belt is relieved, to break or relieve the driving engagement, and substitute an anti-friction engagement between the belt and cones, thereby avoiding the binding action above referred to and enabling the cones to be more easily adjusted toward each other, even when the machinery is shut down.

In the illustrated embodiment of the invention the above mentioned anti-friction members are constituted by opposed plungers 18 carried by the cross pieces 15 of the belt, and arranged to relieve the engagement between the cones and the belt, when desired, during speed ratio adjustments. As shown these anti-friction members 18 carry rotatable balls 19 further to reduce the friction, although plain metal to metal contact between the members 18 and cones 4 may suffice.

So long as the screw 9 is adjusted to keep the belt 5 tight, the anti-friction members 18 are virtually inoperative. In the illustrated form of the invention these members 18 are in the form of plungers slidably carried within hollow casings 20 secured to the cross pieces 15 by bolts 21, and springs 22 yieldingly urge the anti-friction members 18 in opposite directions, into engagement with opposed cones 4. So long as the tension is maintained in belt 5, the normal engaging surfaces 17 of the belt are in driving relation to cones 4, but when the tension in belt 5 is released or relieved, the springs 22 force the anti-friction members 18 outwardly to break the driving and driven relationship by separating the engaging surfaces 17 of the belt from the cones. Under the above conditions the cones may be adjusted toward each other more easily when the machinery is running, or if desired this adjustment may be made while the machinery is shut down. Stops 23 may be provided if desired to limit the outward movement of anti-friction members 18.

While a specific embodiment of the invention has been described it should be understood that many changes may be made therein without departing from the principles of the invention in its broader aspects, within the scope of the appended claims.

I claim:

1. A variable speed transmission of the class described, having opposed cones, mechanism for adjusting said cones toward and from each other, a belt working between said cones, and having frictional surfaces respectively engaging said cones, mechanism for regulating the tension of said belt, anti-friction members positioned to act between said belt and cones, and means operable when the tension in the belt is relieved for moving said anti-friction members to break the frictional engagement between the belt and cones and thereby facilitate the operation of said first mentioned mechanism.

2. A variable speed transmission of the class described, having opposed cones, mechanism for adjusting said cones toward and from each other, a belt working between said cones and having frictional surfaces respectively engaging said cones, mechanism for regulating the tension in said belt and means operable when said tension is relieved for breaking the frictional engagement between the belt and cones to facilitate the operation of said first mentioned mechanism.

3. A variable speed transmission of the class described, having opposed cones, mechanism for adjusting said cones toward and from each other, a belt working between said cones and having frictional surfaces respectively engaging said cones, mechanism for regulating the tension in said belt and opposed anti-friction members also carried by said belt, and means urging said anti-friction members into engagement with the cones.

4. A variable speed transmission of the class described, having opposed cones, mechanism for adjusting said cones toward and from each other, a belt engaging between said cones, mechanism for regulating the tension in said belt, and means operable when the tension in the belt is released for relieving the engagement between said belt and cones to facilitate the operation of said first mentioned mechanism.

5. A variable speed transmission of the class described, having opposed cones, mechanism for adjusting said cones toward and from each other, a belt engaging between said cones, mechanism for regulating the tension in said belt, opposed anti-friction members positioned to act between said belt and cones, and means urging said anti-friction members to move outwardly.

6. A variable speed transmission of the class described, having opposed cones, mechanism for adjusting said cones toward and from each other, a belt engaging between said cones, mechanism for regulating the tension in said belt and spring pressed members adapted to space the belt from the cones when the tension in the belt is relieved.

GEORGE W. SWIFT, Jr.